May 8, 1928.

V. A. FYNN 1,669,083

SYNCHRONOUS MOTOR

Original Filed March 24, 1924

Inventor:
VALÈRE ALFRED FYNN,
By John H. Bruninga
His Attorney.

Patented May 8, 1928.

1,669,083

UNITED STATES PATENT OFFICE.

VALÈRE A. FYNN, OF ST. LOUIS, MISSOURI.

SYNCHRONOUS MOTOR.

Original application filed March 24, 1924, Serial No. 701,461. Divided and this application filed August 2, 1926. Serial No. 126,685.

This application is a division of my former application Serial Number 701,461, filed March 24, 1924, patented Sept. 14, 1926, No. 1,599,758.

My invention relates particularly to synchronous induction motors of the self or the separately excited type. In some of its aspects it is applicable to single as well as to polyphase motors and it also relates to apparatus associated with dynamo electric machines.

The objects and features of this invention will appear from the detail description taken in connection with the accompanying drawings and will be pointed out in the claims.

Figure 1:
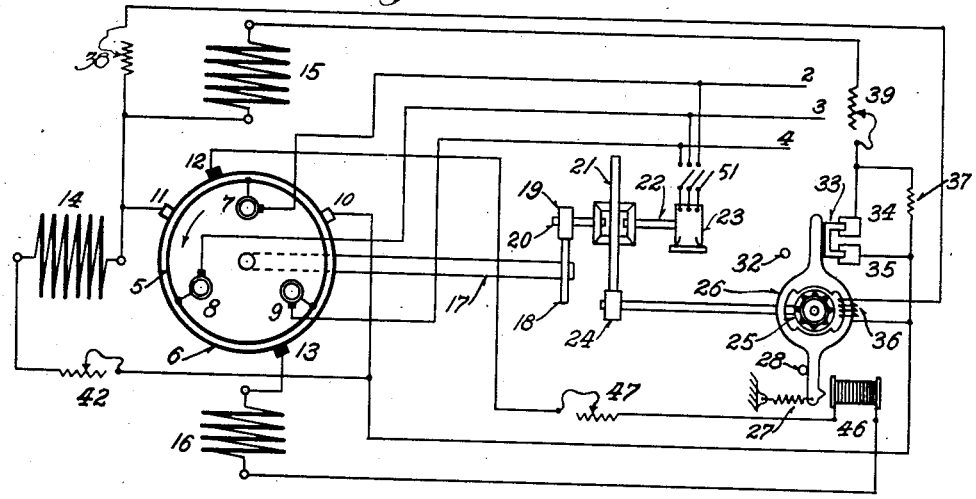
Figure 2:
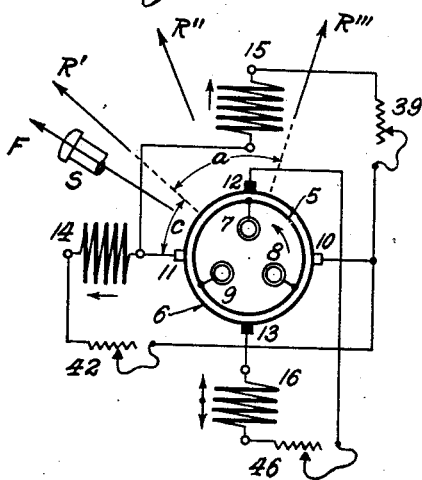
Figure 3:
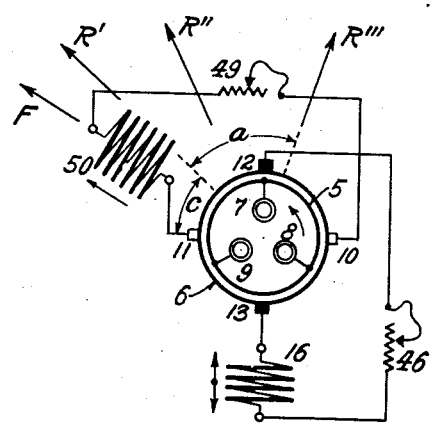

In the accompanying diagrammatic drawings of self-excited two pole machines, Fig. 1 is an embodiment of the invention and Figs. 2 and 3 are explanatory diagrams. These figures are the same as Figs. 2, 4 and 5 of my former application.

Referring to Fig. 1, the synchronous induction motor there shown has a revolving primary and a stationary secondary. The rotor carries a primary three phase winding 5 adapted to be connected to the supply 2, 3, 4 by means of the sliprings 7, 8, 9 and cooperating brushes. It also carries a commuted winding 6, the commutator of which is not shown, it being assumed that the brushes 10, 11 and 12, 13 cooperating with this winding rest directly on same, thus eliminating all uncertainties as to brush position which are apt to be introduced when the connections between the commutator and the commuted winding must be taken into account. The secondary, here the stator, carries two coaxial windings 15, 16 and a third winding 14 displaced by 90 electrical degrees from the coaxial ones. The brushes 10, 11 are located along a line which is parallel to the axis of the winding 14 and connected to 14 through the adjustable resistance 42. These brushes are also connected to the secondary winding 15 through the resistance 37 and the adjustable resistance 39, the brushes 12, 13 are somewhat displaced from the axis of 15 in the direction of rotation of the primary and are connected to the winding 16 through the adjustable resistances 46 and 47.

A switch or relay 25, 26 normally under the control of the spring 27 is adapted to control or modify or reorganize the circuits of the brushes 10, 11 and 12, 13 or of the windings 15 and 16. On the shaft 17 of the main motor is a gear 18 engaging with the gear 19 mounted on the shaft 20 and driving one side of a differential gear, the other side of which is driven by the shaft 22 coupled to the auxiliary synchronous motor 23 connected to the supply 2, 3, 4 through the switch 51. The middle element of the differential carries a gear wheel 21 engaging with the gear wheel 24 and driving the member 25 of the switch or relay. This member is of magnetic material, laminated or not, and preferably carries a short-circuited winding in the form of a squirrel cage. The other member 26 is adapted to oscillate about 25 between the stops 28, 32 and carries an exciting winding 36 connected to the brushes 10, 11 through the adjustable resistance 38. One arm of the switch member 26 insulatingly carries the contact 33 adapted to cooperate with the stationary contacts 34, 35 and when bridging these contacts it shortcircuits the resistance 37 or closes the circuit of the winding 15 if said resistance is not used. It is not necessary to use the resistance 37. Similarly, the other arm of 26 is adapted to change the resistance in the circuit of 16 by more or less compressing the adjustable carbon pile resistance 46 located in the circuit of the winding 16. The resistance 47 is an additional adjustable resistance in the circuit of the winding 16.

It is preferred to so select the number of turns of the winding 14 and the resistance of the circuit comprising this winding that the ampereturns it produces with the commutator brush voltage or the auxiliary voltage available at the brushes 10, 11 when the motor operates at full load is in excess of the ampereturns produced by the armature or primary reaction of the motor at that time. It is further preferred that the number of turns of the windings 14 and 15 and the resistances of the circuits comprising said windings be so chosen that the ampereturns produced by the winding 14 are always in excess of the ampereturns produced by the winding 15. In order to secure a commercially acceptable weight efficiency it is necessary to make the full load of one of these synchronous induction motors at least equal to the full load of the corresponding slipring induction motor. This can readily be secured with the arrangement here described and when speaking of the full load it is the full load of the corresponding slip-ring motor which is meant where weight efficiency is a consideration.

The gear ratio between the motor shaft 17 and the shaft 20 of the differential gear is so chosen that when the main motor runs synchronously the shaft 20 is driven at the synchronous speed of the auxiliary motor 23 coupled to the shaft 22 or more generally that this shaft 20 is driven at the same speed as the shaft 22. Furthermore, shafts 20 and 22 must be driven in opposite directions. With this arrangement the middle element of the differential will be stationary when the main and auxiliary motors run synchronously, and will revolve counterclockwise, as seen from main motor end, when the speed of the main motor is less, and clockwise when it is greater than the synchronous. The gear ratio between the middle element of the differential and the rotor 25 of the relay is preferably so chosen that when the revolving member of the main motor slips through 360 electrical degrees the rotor 25 makes more than one complete revolution irrespective of the number of poles of the relay itself.

It is to be noted that the brushes 10, 11 span less than 180 electrical degrees while brushes 12, 13 span a full pole pitch. The result of this arrangement is that the maximum voltage available from the winding 6 is sometimes available at brushes 12, 13 but never at the brushes 10, 11. If the brushes 10, 11 were located in the axis of 14 instead of being positioned along a line parallel to that of 14 nothing would be changed except the maximum value of the voltage available at said brushes. In so far as mode of operation is concerned a position of the brushes 10, 11 in the axis of 14 is equivalent to a position of said brushes along a line parallel to the axis of 14; both locations of the brushes may justly be spoken of as coaxial with the axis of 14.

In Fig. 2 the rotor carries the primary winding 5 adapted to be connected to the supply by means of sliprings, and also a commuted winding 6, with which cooperate the brushes 10, 11 and 12, 13 displaced by 90 electrical degrees. The stator, here the secondary, carries two coaxial windings 15, 16 and a winding 14 displaced by 90 electrical degrees with respect to the coaxial windings. The brushes 10, 11 are coaxial with the displaced winding and connected to it through the adjustable resistance 42. These brushes are also connected to the winding 15 through the adjustable resistance 39. The brushes 12, 13 are coaxial with 16 and connected to it through the adjustable resistance 46, but in Fig. 2 this circuit is shown open at this adjustable resistance. The arrow F and the pole S indicate the direction and location of the unidirec-tional magnetization produced by the secondary magnetizing means 14 and 15. The arrows R′, R″, R‴ indicate possible positions of the resultant motor magnetization at different loads and synchronous speed.

In Fig. 3 the windings 14 and 15 of Fig. 2 have been combined into a single winding 50 controlled by the adjustable resistance 49 and capable of producing a magnetization of same magnitude and direction as that produced by the resultant of the two magnetizations produced by 14 and 15 respectively. This is a permissible simplification, useful in some cases but not possessed of all of the properties of the arrangement shown in Fig. 2. In other respects Figs. 2 and 3 are identical.

The mode of operation of these improved machines is somewhat as follows: Referring to Fig. 1, let it be supposed that the motor shaft 17 is disconnected from the gear 18 and therefore from the differential gear, that the member 26 of the relay is locked in a position in which 33 bridges the contacts 34, 35 and that the resistance 46 is eliminated. This is equivalent to not making use of the differential gear of the relay. The circuit of the relay winding 36 would then naturally be interrupted at 38 and the auxiliary motor 23 would be disconnected from the supply 2, 3, 4.

The machine may be started by connecting the sliprings 7, 8, 9 to the full supply voltage or a fraction thereof and the resistances 39, 42 and 47 set to produce the desired starting or accelerating torque. The machine will start like an asynchronous induction motor, the revolving field produced in the primary by the polyphase currents supplied to it from the mains generating phase displaced voltages in the windings 14, 15, 16 and giving rise to corresponding secondary induction motor torque producing currents in the usual way. The currents in the winding 15 close through the adjustable resistance 39 and the brushes 10, 11, those in the winding 14 through the adjustable resistance 42 and the same brushes and those in 16 close through the brushes 12, 13 and the adjustable resistance 47. The resistance 37 is not considered because supposed to be shortcircuited by the bridge 33. To increase the torque of the machine the resistances 39, 42, 47 are diminshed in one or more steps until a value is reached which permits the induction motor torque to bring the speed of the machine very close to the synchronous. At this point, and as previously explained by me, the slip frequency commutator brush voltages, the amplitude or magnitude of which is quite independent of the speed of the revolving element of the motor, take a more and more pronounced control of the circuits comprising the windings 14, 15, 16 for the reason that as synchronism is approached the voltages generated in said windings diminish whereas the commutator brush voltages, when derived from a source such as the frequency converter embodied in the motor of Fig. 1 and used there as an exciter for the machine, increase rather than diminish as the speed rises. These commutator brush voltages, which I will also refer to as auxiliary voltages, cause corresponding conduced currents to flow in the windings 14, 15, 16 and these conduced currents, cooperating with the primary revolving field, produce torques which can be utilized to synchronize the motor.

When a slip frequency auxiliary voltage is derived from a suitably driven frequency converter incorporated with the motor, as in Fig. 1, or independent therefrom, then a strictly unidirectional and pulsating, synchronizing torque can be had by making the phase and direction of the auxiliary voltage the same as the phase and direction of the voltage generated near synchronism by the primary flux in the secondary winding on which said auxiliary voltage is impressed. The current conduced into the secondary winding by this auxiliary voltage is practically cophasal with same and the ampere-turns due to it coact with the primary flux to produce the synchronizing torque in question. Such a torque is eminently well suited for positively synchronizing such a motor with little or no disturbance to the line. When a plurality of secondary and displaced motor windings are subjected near synchronism to correspondingly phase displaced auxiliary voltages of proper phase, whether derived from an exciter integral with the motor as in Fig. 1 or separate therefrom, the resulting torque is composed of a plurality of phase displaced unidirectional and pulsating torque and can be made continuous and, if desired, practically constant by suitably spacing the component torques and suitably selecting their individual amplitudes. When the phase of the auxiliary voltage differs 90 degrees from the phrase of the voltage generated in the secondary motor winding on which said auxiliary voltage is impressed, preferably leading it by the amount stated, then the torque produced by the resulting current in cooperation with the primary revolving field is an alternating torque of double the slip frequency of the main motor or of double the frequency of the auxiliary voltage, its negative and positive maxima are equal and its amplitude is for otherwise equal conditions but about one half of that of the unidirectional torque which could be had by shifting the phase of the auxiliary voltage back through 90 degrees.

Now in Fig. 1 the brushes 10, 11 are coaxial with the secondary winding 14 to which they are connected and the voltage appearing at these brushes at sub-synchronous speeds, and generated in the winding 6 by its rotation relatively to the primary revolving flux of the motor, is either of same or of opposite phase with the voltage generated by the same flux in 14 according to the manner in which the brushes 10, 11 are connected to the terminals of the winding 14. In Fig. 1 and in the other figures, the connections are such that these voltages are cophasal and codirectional. As regards the winding 15 to which the brushes 10, 11 are also connected the connections and the relation of the respective axes are such that the auxiliary voltage leads the voltage generated in winding 15 by 90 degrees. This is readily recognized when it is remembered that the primary revolving flux revolves against the rotation of the primary. The position of the brushes 12, 13 on the winding 6 is so chosen that the voltage impressed on 16 is substantially cophasal with the voltage generated in 16 near synchronism.

The synchronizing torque produced by 14 is substantially or even strictly unidirectional and pulsating, that produced by 15 is alternating and of double slip frequency. It is clear that the negative impulses of this torque can only be harmful to synchronization and are apt to cause hunting if allowed to assume sufficient proportions. From the synchronizing point of view the action of winding 15 is partly detrimental but this winding has a marked influence on the synchronous operation of the machine in that it helps to affect the value of the power factor with changing load or the compounding characteristic of the machine. This can be seen by reference to Fig. 2 or 3 and will be more fully explained later. The action of the winding 15 is also partly detrimental when the motor is operating subsynchronously under loads in excess of the maximum synchronous load. I have found that the best starting, synchronizing and operating characteristics are obtained with or without the use of winding 16 when the number of turns of the winding 14 and the resistance of its circuit are so chosen that with the unidirectional voltage available in synchronous full load operation at the brushes 10, 11 the number of ampereturns produced by 14 is in excess of the ampereturns produced by the load reaction of the primary. Still better results are had when the ampereturns then produced by 14 are at least equal to the ampereturns simultaneously produced by the winding 15.

The synchronizing torque produced by 16 when connected as just described and as shown in Fig. 1 is practically unidirectional and pulsating, as is that produced by 14, but phase displaced with respect to same. In combination with the latter it produces a more or less constant and unidirectional synchronizing torque. The more nearly equal the amplitudes of these two torques the more constant their resultant. Therefore, when 16 is in use the final resultant torque is the combination of the two unidirectional torques due to 14 and 16 and of the double slip frequency alternating torque due to 15. It is clear that it is an easy matter to so dimension 16 and its circuits that the final resultant torque will have no negative values whatsoever. Under these conditions synchronization will be extremely powerful and rapid and will not cause any hunting even though the synchronizing torque is not constant. Furthermore, the normal asynchronous overload capacity will remain practically unimpaired and may even be increased.

But the winding 16 also exerts an influence on the synchronous operation of the machine as will be more fully explained in connection with Figs. 2 and 3. For the time being it is sufficient to note that the motor will operate synchronously at a plurality of loads with nothing but the brushes 10, 11 connected to the winding 14, or with the brushes 10, 11 connected to the windings 14 and 15 or with the brushes 10, 11 connected to the windings 14, 15 and with the brushes 12, 13 connected to the winding 16. In this last case the winding 16 modifies the compounding characteristic of the synchronously operating machine according to the position of the axis of the brushes 12, 13 with respect to the axis of the winding 16 and according to the number of ampereturns in 16.

I may, therefore, start the motor in the manner already described and operate same without change, or I may start it as described and increase the resistance of the circuit comprising the winding 16 after synchronism is reached, or I may start the motor with the circuit of the winding 15 interrupted and connect said winding to the brushes 10, 11 at or near synchronism and thereafter increase the resistance of the circuit comprising the winding 16 or not as desired.

Particularly in the case of larger motors I can make use of the differential gear and relay shown in Fig. 1 in order to control the motor circuits. At starting, the main motor is connected to the supply and the resistances in the secondary circuits 14, 15, 16 set to secure the desired starting torque. At such time the switch 51 is open, the circuit 36 of the relay is open at 38 and the relay member 26 in the control of the spring 27. This means that the contacts 34, 35 are bridged, the resistance 37, if used, is shortcircuited and the other arm of 26 out of contact with the carbon pile resistance 46. As the motor starts the resistances of the active secondary circuit can be diminished in the usual way to incerase torque and speed. The shaft 22 of the differential being at rest, the rotor 25 will revolve counterclockwise, as seen from the main motor so long as said motor revolves counterclockwise. After a certain speed has been reached, switch 51 is closed, the motor 23 run up to synchronism and the circuit of 36 closed which excites the member 26 of the relay. As the auxiliary motor speeds up 25 slows down and as the speed of 23 exceeds the speed at which the main motor drives the shaft 20 the rotor 25 stops and reverses, now running clockwise. Because 26 is now excited a considerable torque, varying with speed, is developed between 25 and 26 and soon reaches a value which overpowers the spring 27 and causes the relay to break the direct connection between the contacts 34, 35 and compress the carbon pile resistance 46. This gives 16 the number of ampereturns suitable for synchronization and reduces the magnitude of the double slip frequency alternating torque produced by 15 to an extent dependent on the value of the resistance 37. Prompt synchronization results, whereupon the speed of shaft 20 equals that of shaft 22 and the rotor 25 comes to rest, relinquishing 26 to the control of the spring 27. This results in the bridging or shortcircuiting of the contacts 34, 35, thus restoring 15 to its full activity, and in removing the pressure on 46 which reduces the number of ampereturns in 16 to a figure suitable for the desired compounding characteristic. Should the motor slip out of synchronism due to an overload or to some other cause and run at a speed below the synchronous, the rotor 25 is instantly set in motion in a clockwise direction, as seen from the main motor end, and the synchronizing connections instantly re-established by the relay. In this case the relay diminishes the negative torque produced by 15 directly by reducing the ampereturns in 15, even to zero if 37 is omitted, and indirectly by rendering 16 fully effective and thus opposing whatever negative torque 15 still produces.

It is not necessary to use the resistance 37 in the circuit of 15; this circuit may be entirely interrupted when the contacts 34, 35 are not bridged but the use of resistance reduces the possibility of sparking at the relay contacts and it can usually be so proportioned as to be more helpful than otherwise.

Nor is it necessary to reduce the effectiveness of the winding 15 during the synchronizing period or upon the occurence of overloads. Sufficiently good results will in most cases be secured by simply utilizing the relay to modify the effectiveness of the winding 16.

Some of the features of this invention, particularly during synchronous operation, will perhaps be better understood by reference to Figs. 2 and 3. In Fig. 2 let it be supposed that the rotor, here the primary, revolves counterclockwise, that 16 is omitted and the component magnetizations produced by the magnetizing means or windings 14 and 15 are in the direction of the small arrows placed alongside these windings. Further let the total secondary magnetization, here due to 14 and 15 be F as to position and direction. This magnetization F is the secondary flux of the machine and may have a number of components, for instance any of the magnetizations produced by the windings 14, 15 or 16. The pole S is shown riding the arrow F to more clearly indicate the pole of the unidirectional magnetization produced by the secondary windings 14 and 15. This magnetization may and does change with load in so far as its magnitude is concerned, but its direction and space position remain constant as long as synchronism is preserved and winding 16 is not in use. The resultant magnetization R of the motor, however, changes its space position and to some extent also its magnitude as the load varies. When R changes its space location with respect to F the projection of F on the perpendicular to R changes in magnitude and since this component of F is the one which determines the torque of the synchronously operating machine, this torque clearly changes with changing load as is necessary to enable the motor to carry variable load at synchronous speed. One component of R is F, the other is the armature or primary load reaction. When the primary revolves, the secondary unidirectional magnetization, the primary armature reaction and the resultant R are all stationary in space except when the load changes, at such time synchronism is momentarily departed from and the armature reaction and the resultant R change their position or magnitude or both. When the primary is at rest and the secondary revolves, as is usually the case in the larger and the separately excited motors, then the secondary unidirectional magnetization, the armature reaction and the resultant magnetization R all revolve synchronously and change their relative space positions with changing load by momentarily departing from synchronous rotation. At light loads the resultant motor magnetization may be R' and can be made to nearly coincide with F, for a heavier load this resultant may be R'' and will be further removed from F, for a still higher load it may be located as R''' is with reference to F.

The only magnetization which affects the magnitude of any auxiliary or brush voltage is the resultant magnetization R. Disregarding the winding 16 for the moment and remembering that in order to get a high output for weight and a considerable overload capacity with acceptable power factor values at the motor terminals it is necessary for the auxiliary voltage, which here is taken from the brushes 10, 11, to rise with rising load, it is clear that it is, in this respect, of advantage to have F lie close to the axis of 14 and R lie close to F at no load; for instance in the position of R'. Under these circumstances, the resultant R can travel through a considerable angle, as well seen in Fig. 2, before it comes to stand at right angles to the axis of the brushes 10, 11, at which time the maximum auxiliary voltage will be reached, and R can even travel well beyond that position before a marked diminution occurs in this auxiliary voltage. Which all means that the overload capacity of the machine will be great. But the power factor regulation or compounding and the magnitude and configuration of the synchronizing torque are not necessarily satisfactory under these conditions. It is simple enough to locate the axis of F close to that of 14. This is achieved by suitably selecting the ratio of the ampereturns in the two windings 14 and 15 but nothing in particular is gained thereby unless the dimensioning of the windings 14 and 15 permits of securing an F of suitable magnitude for synchronizing, and provides for R falling close to F at no-load and at the beginning of an arc $a$ which is so located with reference to the brushes 10, 11 as to secure a variation of the auxiliary voltage which will give a practically acceptable compounding characteristic when R travels through this arc with increasing load. These all important results can only be achieved when the number of turns in the windings 14 and 15 and the resistance of their circuits are so chosen that the ampereturns produced in 14, with the auxiliary voltage available at full load, are in excess of the ampereturns set up by the primary or armature reaction at full load and preferably also greatly in excess of the ampereturns simultaneously produced by the winding 15. A ratio of the ampereturns in 14 to those in 15 as high as 2 and 3 to 1 gives very good results. The auxiliary voltage is at all times proportional to sine $c$ which measures the angular displacement between R and the brush axis.

It is further seen that as the load increases the voltage at the brushes 12, 13 decreases. If the winding 16 is used together with the windings 14, 15 and left in circuit after synchronism has been reached, its effect will first diminish but may later increase with increasing load. It will increase with increasing load if R travels past the axis of the brushes 12, 13, for instance as R''' has done. So long as the resultant R lies somewhere between the brushes 11 and 12, the ampereturns in 16 will oppose those in 15 and reduce the power factor of the motor. When R coincides with the axis of the brushes 12, 13 the winding 16 will be quite inactive and when the axis of R moves past 12 in a direction against the rotation of the primary, the ampereturns in 16 will begin to assist those in 15. The result of all this will be that F will travel to some extent against rotation of the primary as the load increases. For this reason 16 should be used cautiously at synchronism. If 16 is not required to boost or modify the shape of the synchronizing torque to a very marked extent it can usually be left in circuit at synchronism. At synchronism the winding 16 can successfully be used, for instance, as a means of modifying the compounding characteristic. To this end the resistance of its circuit must sometimes be increased at synchronism as is automatically done in Fig. 1. As a further means to this end I may move the brushes 12, 13 either backward or forward. If I move them forward or in the direction of rotation of the primary as shown in Fig. 1, then the maximum voltage available at the brushes 12, 13 at synchronism will be reduced but without at all decreasing the magnitude and, if the displacement is moderate, without very materially changing the phase of this auxiliary voltage at sub-synchronous speeds when the winding 16 is to perform its primary function of increasing the magnitude or improving the configuration of the synchronizing torque and thus improving synchronization and reducing the interference with the asynchronous overload capacity of the motor. The compounding characteristic is also influenced by the position of these brushes 12, 13. If these brushes are displaced from coincidence with the axis of 15 in the direction of rotation of the primary, then the winding 16 will begin by opposing the winding 15. As R travels against rotation this opposition will decrease and 16 will finally help 15. If these brushes are displaced in the opposite direction then R may not travel far enough to ever reverse the ampereturns in 16 and a different compounding characteristic will result.

Fig. 3 differs from Fig. 2 in that the windings 14 and 15 are combined into a single winding 50. In so far as operation at synchronous speed is concerned, the machines are similar and in order to get the best results the winding 50 must be so dimensioned that with the auxiliary voltage available at full load that component of the ampereturns it produces which coincides with the axis of the brushes 10, 11 is at least equal to the ampereturns sent up by the primary armature reaction at full load and preferably also considerably in excess of that component of its total ampereturns which is perpendicular to the axis of the brushes 10, 11.

It is to be understood that a synchronous motor is a machine capable of operating at a constant and synchronous speed under varying load conditions and which does so operate. The synchronous motors described in this specification carry unidirectional ampereturns F on their secondary and unless the organization of the machine is such as to permit, with changing torque demand, (1) of an angular displacement between the axis of F and the axis of the resultant motor magnetization R, or (2) of a change in the magnitude of F, or (3) of said angular displacement and of said change in magnitude, the motor cannot and does not run at a constant and synchronous speed under varying load conditions.

It is further to be understood that by "synchronous torque" is meant a torque exerted by a synchronous motor when in normal operation and, therefore, when running synchronously under load. By "synchronizing torque" is meant any torque adapted to or capable of bringing up to synchronism a motor capable of operating synchronously under varying load conditions. It is, for instance, known that an ordinary polyphase induction motor is a non-synchronous machine the torque of which falls off very rapidly as synchronism is approached and actually becomes zero at synchronism. It is also known that a polyphase induction motor can be so modified as to make it capable of operating synchronously under varying load conditions. Any torque which, in a polyphase induction motor adapted to operate synchronously under varying load, will bridge the gap between the induction motor torque of the machine, which becomes zero at synchronism, and its synchronous torque is referred to as a "synchronizing torque".

A synchronous motor is said to be "compound" when the unidirectional ampereturns on the secondary are smaller at light than at heavy loads. This change in the unidirectional ampereturns with changing load affects the power factor at which the machine operates. The change can be such that the power factor remains practically constant throughout the synchronous load range of the motor, or it can be such that the power factor is a leading one at light loads, that this lead diminishes with increasing load and is converted into a lag near the maximum synchronous torque of the machine. Either of these "compounding characteristics" are popular and right now the last named is probably more in demand.

Synchronous motors embodying the characteristic structural features of the asynchronous induction motors, such as absence of defined polar projections on stator and rotor, distributed windings and short airgaps, are sometimes referred to as "synchronous-induction motors" because of their ability to operate synchronously over one range of loads and non-synchronously over another range of loads.

Any displacement of the axis of a set of commutator brushes from the axis of the secondary winding to which they are connected causes the synchronizing torque to deviate from strict unidirectionality and to become alternating. For a displacement of 90 electrical degrees this torque is an alternating torque of double slip frequency with equal positive and negative maxima. For a displacement of 45 electrical degrees a negative maximum is only about 18 percent of a positive maximum and the latter last three times as long as the former. Furthermore, the positive maximum is only about 18 per cent less than the positive maximum available when the synchronizing torque is strictly unidirectional. For a displacement of 45 degrees, the amplitude of the unidirectional synchronizing torque component is theoretically double that of the double frequency alternating component and as long as the amplitude of the double frequency component does not materially exceed half the amplitude of the unidirectional component the resultant synchronizing torque can be considered as substantially unidirectional. Similarly when the resultant synchronizing torque is due to more than one winding on the secondary connected to one or to more than one set of cooperating commutator brushes, or, generally, to a plurality of auxiliary voltages, then said torque can be considered substantially unidirectional so long as the amplitude of its double frequency component does not materially exceed half the amplitude of its unidirectional component.

Since very little power is required to operate the relay 25, 26, it will be understood that the differential gear and the gear wheels 18, 19 and 24 can be very small and this is also true of the auxiliary synchronous motor 23. Noiseless rawhide or fiber gearing can very well be used for this purpose and need not occupy more than a very restricted space.

It is immaterial whether the primary or the secondary is designed to revolve, but it is to be noted that when the secondary revolves instead of the primary, brush displacements and other adjustments referred to direction of rotation of the revolving member are to be made in the opposite direction. For example, a brush displacement in the direction of rotation when the primary revolves is equivalent to a brush displacement against the direction of rotation when the revolving member is the secondary.

It is also useful to note that while a displacement of the brushes with rotation when the primary revolves is equivalent to a displacement of the brushes against rotation when the secondary revolves, yet in both cases the brushes are displaced against the direction of rotation of the revolving field produced by the primary.

A brush displacement against rotation of the primary or in the direction of rotation of the secondary is in either case a brush displacement in the direction of rotation of the primary flux.

It is also to be understood that the invention is equally applicable to separately excited synchronous induction motors excited from frequency converters and the like, broadly from a source supplying one or more voltages which are of slip frequency at subsynchronous speeds and become unidirectional at synchronism of the motor to which they are applied.

In order to make full use of the properties of the improved motor I prefer to design both members without defined polar projections, using a short air-gap and well distributed windings as is usual in good induction motor practice. In that way good starting, powerful and smooth synchronizing and high weight efficiency can be secured.

The reason for showing the commuted winding 6 as separate from the three-phase winding 5 is to indicate that as a rule these two windings must be designed for very different voltages. In order to secure good commutation and avoid dangerously high voltages in the windings 14, 15 and 16 and 50 at starting, it is necessary to make the maximum brush voltage much smaller than even the lowest usual distribution voltage applied to 5. There are various known modifications of such windings and these may be used instead of the arrangement shown in the figures without modifying the mode of operation of my improved motor.

While theories have been advanced in connection with the machines referred to herein, this has been done with a view to facilitating their description and understanding but it is to be understood that I do not bind myself to these or any other theories.

It is clear that various changes may be made in the details of this disclosure without departing from the spirit of this invention, and it is, therefore, to be understood that this invention is not to be limited to the specific details here shown and described. In the appended claims I aim to cover all the modifications which are within the scope of my invention.

What I claim is:

1. In a motor which carries variable load at synchronous speed, a primary and a secondary, said primary being adapted for connection to an alternating current supply, a commuted winding on the primary, brushes cooperating with said commuted winding, means located on the secondary and connected to the brushes for producing a unidirectional magnetization at an angle to the perpendicular to the brush axis, and means for producing in the perpendicular to the brush axis a unidirectional magnetization varying with the load.

2. In a motor which carries variable load at synchronous speed, a primary and a secondary, said primary being adapted for connection to an alternating current supply, a commuted winding on the primary, brushes cooperating with said commuted winding, means located on the secondary and connected to the brushes for producing a unidirectional magnetization at an angle to the perpendicular to the brush axis, and means for producing in the perpendicular to the brush axis a unidirectional magnetization which first decreases and then increases with increasing load.

3. In a motor which carries variable load at synchronous speed, a primary and a secondary, said primary being adapted for connection to an alternating current supply, a commuted winding on the primary, brushes cooperating with said commuted winding, means located on the secondary and connected to the brushes for producing a unidirectional magnetization at an angle to the perpendicular to the brush axis, and means for producing in the perpendicular to the brush axis a unidirectional magnetization which varies in direction with increasing load first opposing and later assisting the coaxial component of the other unidirectional magnetization.

4. In a motor which carries variable load at synchronous speed, a primary and a secondary, said primary being adapted for connection to an alternating current supply, a commuted winding on the primary, brushes cooperating with said commuted winding, means located on the secondary and connected to the brushes for producing a unidirectional magnetization at an angle to the perpendicular to the brush axis, and means for producing in the perpendicular to the brush axis a unidirectional magnetization which diminishes with increasing load.

5. In a motor which carries variable load at synchronous speed, a primary and a secondary, a source of current adapted to supply a plurality of voltages which are unidirectional when the motor runs synchronously and of slip frequency at other motor speeds, and means independent of the excitation or speed of the source of current adapted to impress on the secondary the full amplitude of said voltages for synchronizing the motor and but a fractional value of one of said voltages at synchronism.

6. In a motor which carries variable load at synchronous speed, a primary and a secondary, a source of current adapted to supply a plurality of voltages which are unidirectional when the motor runs synchronously and of slip frequency at other motor speeds, and means independent of the excitation or speed of the source of current adapted to impress on the secondary a higher maximum value of one of said voltages for synchronizing than for unidirectional excitation.

7. In a motor which carries variable load at synchronous speed, a primary and a secondary, said primary being adapted for connection to an alternating current supply, a commuted winding on the primary, two displaced sets of brushes cooperating with the commuted winding, means located on the secondary and connected to one of the brush sets for producing a unidirectional magnetization displaced from the axis and from the perpendicular to the axis of the brush set to which it is connected, and other means connected to the other set of brushes to produce a unidirectional magnetization substantially in line with the perpendicular to the axis of the first brush set.

8. A motor which carries variable load at synchronous speeds, having a primary and a secondary, means on the secondary adapted to magnetize said secondary along one axis, other means on the secondary adapted to magnetize said secondary along an axis displaced from the first by an angle other than 90 electrical degrees, a commuted winding on the primary, and two sets of brushes located along displaced axes and cooperating with the commuted winding, one set of brushes being connected to one magnetizing means on the secondary and the other set of brushes being connected to the other magnetizing means on the secondary.

9. A motor which carries variable load at synchronous speeds, having a primary and a secondary, means on the secondary adapted to magnetize said secondary along one axis, other means on the secondary adapted to magnetize said secondary along an axis displaced from the first by an angle other than 90 electrical degrees, a commuted winding on the primary, two sets of brushes located along displaced axes and cooperating with the commuted winding, one set of brushes being connected to one magnetizing means on the secondary and the other set of brushes being connected to the other magnetizing means on the secondary, the axis of one brush set being displaced from the perpendicular to the axis of the secondary magnetization produced by the magnetizing means to which it is connected, and the axis of the other brush set approximately coinciding with the axis of the secondary magnetization produced by the magnetizing means to which said other set is connected.

10. A motor which carries variable load at synchronous speeds, having a primary and a secondary, means on the secondary adapted to magnetize said secondary along one axis, other means on the secondary adapted to magnetize said secondary along an axis displaced from the first by an angle other than 90 electrical degrees, a source of two auxiliary voltages which are of different phase and of slip frequency at sub-synchronous speeds and of a magnitude independent of their frequency, and which become unidirectional at synchronism, means for impressing one auxiliary voltage on one of the magnetizing means on the secondary, and means for impressing the other auxiliary voltage on the other magnetizing means on the secondary.

11. A motor which carries variable load at synchronous speeds, having a primary and a secondary, means on the secondary adapted to magnetize said secondary along one axis, other means on the secondary adapted to magnetize said secondary along an axis displaced from the first by an angle other than 90 electrical degrees, a source of two auxiliary and unidirectional voltages both of which vary in magnitude when the load on the synchronously operating motor varies and one of which is of one direction at one load and of the opposite direction at another load, means for impressing one auxiliary voltage on one of the magnetizing means on the secondary, and means for impressing the other auxiliary voltage on the other magnetizing means on the secondary.

12. A motor which carries variable load at synchronous speed, having a primary and a secondary, said primary being adapted for connection to an alternating current supply, three windings on the secondary two of which are coaxial and the third displaced 90 electrical degrees from the coaxial ones, a commuted winding on the primary, two sets of brushes cooperating with the commuted winding, the first set of brushes being coaxial with the displaced winding and connected to it and to one of the coaxial windings, to produce in synchronous operation, a secondary magnetization displaced from the perpendicular to this first set of brushes, and the second set being displaced from the first and connected to the other coaxial winding to produce in synchronous operation a secondary magnetization approximately coinciding with the perpendicular to said first set of brushes.

13. The method of operating a motor which carries variable load at synchronous speed, comprising, producing a primary flux which revolves with respect to the primary, generating auxiliary voltages which are of slip frequency and differ in phase near synchronism and become unidirectional at synchronism, impressing one auxiliary voltage on a secondary circuit to produce in cooperation with the primary flux a substantially unidirectional synchronizing torque and at synchronism a part of the secondary unidirectional magnetization, impressing another auxiliary voltage on another secondary circuit to produce a substantially unidirectional synchronizing torque differing in phase from the first substantially unidirectional synchronizing torque, and at synchronism another part of the secondary unidirectional magnetization, and causing the magnitude of the auxiliary voltages to so vary in synchronous operation as to change the magnitude of the torque component of the resultant secondary unidirectional magnetization with changing motor load.

In testimony whereof I affix my signature this 30th day of July, 1926.

VALÈRE A. FYNN.